(12) United States Patent
Sauvage

(10) Patent No.: US 6,651,185 B1
(45) Date of Patent: Nov. 18, 2003

(54) HIGH AVAILABILITY PLATFORM WITH FAST RECOVERY FROM FAILURE BY REDUCING NON-RESPONSE TIME-OUTS

(75) Inventor: Pierre Sauvage, Notre Dame des Commiers (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/557,287

(22) Filed: Apr. 24, 2000

(30) Foreign Application Priority Data

Dec. 16, 1999  (EP) .............................. 99410179

(51) Int. Cl.[7] .............................................. G06F 11/00
(52) U.S. Cl. ............................ 714/15; 714/55; 714/11
(58) Field of Search ............................ 714/15, 55, 23, 714/815, 47, 11, 13

(56) References Cited

U.S. PATENT DOCUMENTS

| | | | | |
|---|---|---|---|---|
| 5,737,515 A | * | 4/1998 | Matena | 714/23 |
| 5,978,933 A | * | 11/1999 | Wyld et al. | 714/13 |
| 6,023,772 A | * | 2/2000 | Fleming | 714/13 |
| 6,148,415 A | * | 11/2000 | Kobayashi et al. | 714/15 |
| 6,272,113 B1 | * | 8/2001 | McIntyre et al. | 370/248 |
| 6,370,656 B1 | * | 4/2002 | Olarig et al. | 714/23 |
| 6,477,663 B1 | * | 11/2002 | Laranjeira et al. | 714/11 |

OTHER PUBLICATIONS

Wyld, Brian C. et al., "High Availability in the HP OpenCall SS7 Platform", *Hewlett-Packard Journal*, pp. 65–71 (Aug. 1997).

* cited by examiner

*Primary Examiner*—Scott Baderman
*Assistant Examiner*—Christopher McCarthy

(57) ABSTRACT

A high availability platform runs a fault-tolerant controller process (FTC) and at least one monitored process that indicates its live state by periodically sending a heart-beat message to the FTC. The FTC responds to the heart-beat message by modifying the frequency at which it expects the heart-beat message according to information contained therein.

The platform may run an additional process, the monitored process being adapted to regularly send the additional process a message and to notify the FTC that the additional process is dead when it receives an error code from an operating system after sending a message to the additional process.

8 Claims, 2 Drawing Sheets

HIGH AVAILABILITY PLATFORM WITH FAST RECOVERY FROM FAILURE BY REDUCING NON-RESPONSE TIME-OUTS

FIELD OF THE INVENTION

The present invention relates to high availability computer platforms, especially those used for Signalling System 7 (SS7) network management.

BACKGROUND OF THE INVENTION

An exemplary high availability platform wherein the invention may be used is disclosed, for instance, in Hewlett-Packard Journal, August 1997, "High Availability in the HP OpenCall SS7 Platform".

FIG. 1 illustrates the fault tolerant mechanism used in this platform. The platform comprises two systems, an active system A and a rescue system B. In practice systems A and B are two separate computers.

Each system runs a Fault Tolerant Controller (FTC) process which is in charge of managing the vital processes running on the system. System A runs a plurality of active processes P1$a$, P2$a$, P3$a$ ..., while system B runs a plurality of standby processes P1$s$, P2$s$, P3$s$ ..., respectively corresponding to the active processes of system A. The standby processes, although inactive, are periodically synchronized with their corresponding active processes by replication messages, so that they are ready to take-over the task of the active processes at any time.

The health of the processes is monitored by the FTC through a heart-beat mechanism. Each process, either active or standby, periodically sends a heart-beat message to the corresponding FTC. If the FTC does not receive such a message within a predetermined amount of time (a preset "time-out"), it will declare the process dead and carry out any necessary action, such as respawning the process.

In fact, in order to obtain a higher degree of confidence, a process is declared dead only if the FTC receives a heart-beat failure information through a second path. This second path is established through the other system, via heart-beat messages sent between the active processes and their respective standby processes and between the FTCs running on the two systems.

For instance, if process P1$a$ dies, the FTC of system A will detect the absence of a heart-beat, and so will process P1$s$. Process P1$s$ then sends the FTC of system B, within a heart-beat message, information indicating that process P1$a$ may be dead. The FTC of system B passes this information, also within a heart-beat message, to the FTC of system A, which can thus double-check the fact that process P1$a$ is dead.

If there is a contradiction between the heart-beat information obtained directly from process P1$a$ and indirectly from process P1$s$, the FTC may take other measures to ensure process P1$a$ is in good health, such as explicitly killing it and respawning it.

The heart-beat period and the time-out should be chosen such that a dead process is respawned within an acceptable period of time. The time-out after which an FTC declares a mute process dead is chosen to be slightly greater than the longest atomic operation a process may have to carry out. An atomic operation, in a multi-tasking system, is an operation that cannot be interrupted, for instance to switch between two concurrent tasks. The sending of a heart-beat message by a process requires an interruption of the process, for instance by a timer. If a process is carrying out an atomic operation when it receives an interruption request, the process will only respond to the interruption request at the end of the atomic operation.

In the above exemplary OpenCall SS7 platform, important processes, such as the SS7 protocol stack, should not be unavailable (dead) more than a relatively short period of time, targeted for instance at 6 seconds. This means the time-out period must in principle be smaller than 6s and the heart-beat period even smaller. Moreover, an FTC on one system will declare a process dead and respawn it, in practice, only after receiving a confirmation from the FTC on the other system. Such confirmation is delayed by twice the message transport overhead between systems A and B, and will be expected within a second time-out period. This puts additional constraints on the time parameters, to the extent that it may not be possible to satisfy the targeted 6 seconds for respawning the protocol stack. It is also difficult to increase the heart-beat frequency in order to relax other constraints, because the processing of the heart-beat messages would become excessively CPU-time consuming. A value of 2 seconds for the heart-beat period is a tradeoff between low CPU-time consumption and short reaction time.

Moreover, several processes likely to run on the above platform may carry out atomic operations which take a long time with respect to the heart-beat period. One such process is a database manager which responds to database queries in a short time, but which must periodically carry out a database update in an atomic operation. Such an update takes a time depending on the size of the database, and may be on the order of the minute.

Typically processes like the database manager, requiring the time-out to be set above one minute, would not be monitored, so that the time-out can be set to a value compatible with important processes that must be respawned quickly, such as the SS7 protocol stack. However, problems then arise if such processes die unexpectedly.

SUMMARY OF THE INVENTION

The present invention is directed in general to providing the above platform with a quick respawning capability of important processes.

One difficulty to overcome is that of monitoring processes requiring long atomic operations, without disabling the quick respawning capability of other processes.

Another difficulty is to satisfy targeted respawning times of certain processes.

These difficulties are overcome in a high availability platform arranged, in operation, to run a fault-tolerant controller process (FTC) and at least one monitored process arranged to indicate its live state by periodically sending a heart-beat message to the FTC. The FTC is arranged to respond to the heart-beat message by modifying the frequency at which it expects the heart-beat message according to information contained therein.

The platform may be arranged to run an additional process, the monitored process being arranged to regularly send the additional process a message and to notify the FTC that the additional process is dead when it receives an error code from an operating system after sending a message to the additional process.

The platform may comprise two systems, each arranged, in operation, to run an FTC and associated monitored processes, a plurality of processes running on at least a first system being in standby mode and corresponding to respective active processes on the second system, such that, if the second system fails, the standby processes of the first system become active and take over the tasks of the processes that were active on the second system. When it is necessary to force shut down of one system, the FTC of this system is arranged to send the processes a switch-over signal, causing said active processes to die and the respective standby processes on the other system to become active through a transition phase in which the processes do not perform input/output operations.

The foregoing and other objects, features, aspects and advantages of the invention will become apparent from the following detailed description of embodiments of the present invention when taken in conjunction with the accompanying drawings.

BEST MODE OF CARRYING OUT THE INVENTION

Figure 2:
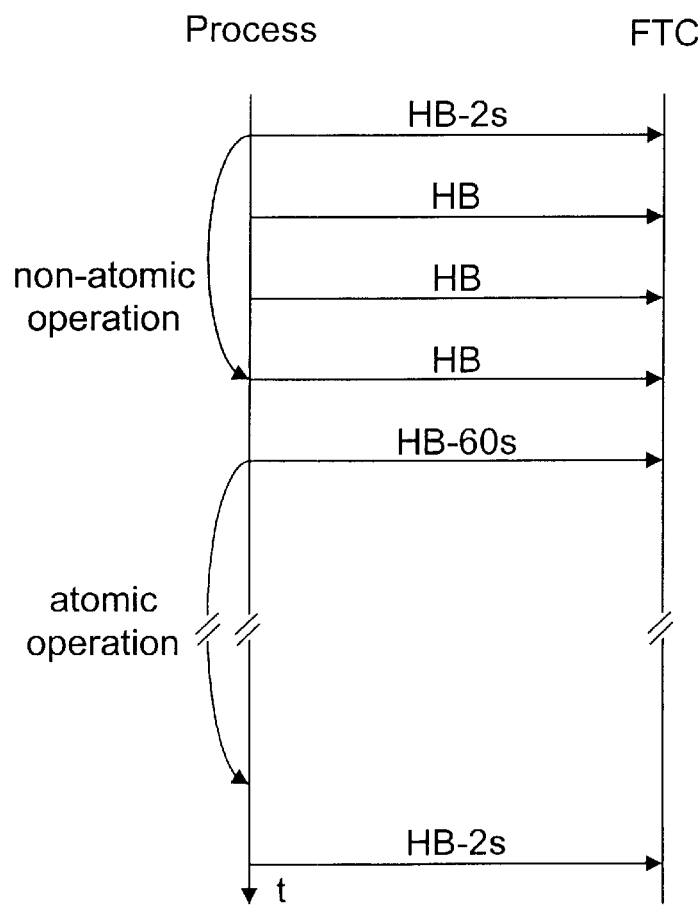
FIG. 2 is a time diagram illustrating a dynamic heart-beat frequency change according to the invention.

FIG. 2 illustrates successive heart-beat messages sent by a process to the Fault Tolerant Controller (FTC). During a non-atomic operation, the process may be interrupted to send the FTC a periodic heart-beat message. The first heart-beat message sent, HB-2 s, contains time information indicating to the FTC at what frequency it should expect the heart-beats from the process, say every 2 seconds. It is not necessary that the subsequent heart-beat messages contain such time information.

Until a heart-beat message contains different time information, the FTC will expect a periodic heart-beat, every 2 s in the example. When the FTC does not receive a heart-beat in time, it may immediately declare the process dead. However, such a declaration is preferably confirmed, for instance, as explained in relation with FIG. 1, through a standby process running on a backup system, which also receives the heart-beats and time information contained therein.

The FTC will thus set its time-out period to be slightly greater than the heart-beat period and, when necessary, will use a second time-out for receiving a death confirmation.

Prior to carrying out an atomic operation, i.e. an operation that cannot be interrupted, the process will send a heart-beat message HB-60 s containing an increased time information, say 60 seconds, greater than the maximum time it may take to carry out the atomic operation. The next heart-beat will thus be sent at a time when the process is no longer carrying out the atomic operation. In response to heart-beat message HB-60 s, the FTC will have readjusted its time-out to a value slightly greater than the corresponding heart-beat period.

Again, if a subsequent heart-beat is not received by the FTC within the new time-out, the FTC declares the process dead, or expects a confirmation before doing so.

A consequence of this dynamic heart-beat mechanism is that each process individually sets its heart-beat frequency. A first advantage is that processes carrying out non-atomic operations will be respawnable by the FTC as fast as their heart-beat frequency allows, independently of the heart-beat frequencies of other processes. Another advantage is that less critical processes may be assigned a lower heart-beat frequency, whereby less CPU-time is consumed to deal with them, allowing more critical processes to have higher heart-beat frequencies than the previously mentioned 2-seconds tradeoff.

When a process death confirmation is used on the platform, such a confirmation is received by an FTC on one system via a backup system, needing a message to be sent twice between the two systems. This represents a substantial time to wait before a dead process can be respawned.

Figure 3:
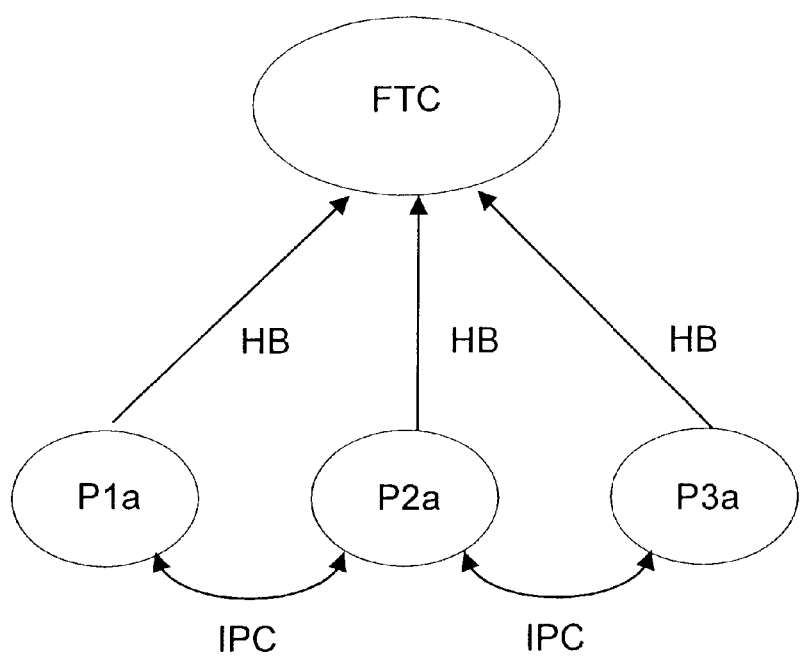
FIG. 3 illustrates an improved high-availability mechanism according to the invention.

FIG. 3 illustrates a mechanism used to reduce the time between the detection of the absence of a heart-beat by an FTC and a reception of a confirmation by the FTC. Active processes P1a, P2a, P3a running on a same system generally communicate with each other using a standard Inter-Process Communication (IPC) protocol, usually through messages. If a process to which a message is sent is dead, the operating system returns an error code to the originator of the message. The originator normally handles this error code in any adequate manner.

Advantageously, when a first process receives such an error code after sending a message to a second process, the first process notifies the FTC that the second process is not responding, for instance within its next heart-beat message. Such a message is interpreted by the FTC as a confirmation of the death of the second process, and is likely to reach the FTC faster than a confirmation sent via a backup system.

The information needed for monitoring and running the processes are normally contained in a configuration file which is parsed by the FTC at start-up of the platform. The FTC is thus responsible for starting the processes. This file contains information such as the command-lines for starting the various processes and parameters indicating the execution mode of the processes (run-once, respawnable, respawn delay, highly available . . . ). The file is consulted regularly by the FTC to handle the processes.

A problem arises when a new process, which is not listed in the configuration file, needs to be executed. In practice, the configuration file is updated with the new process parameters, all the processes are killed, and the FTC is reset with a "kill-2" command (in a Unix-like operating system) so that it parses again the configuration file.

To avoid this complexity, the FTC is programmed so that it no longer starts the processes listed in the configuration file. The file may be initially empty. Each process is started individually and is programmed to communicate its parameters upon start-up to the FTC, which in response updates the configuration file with the relevant information.

Figure 1:
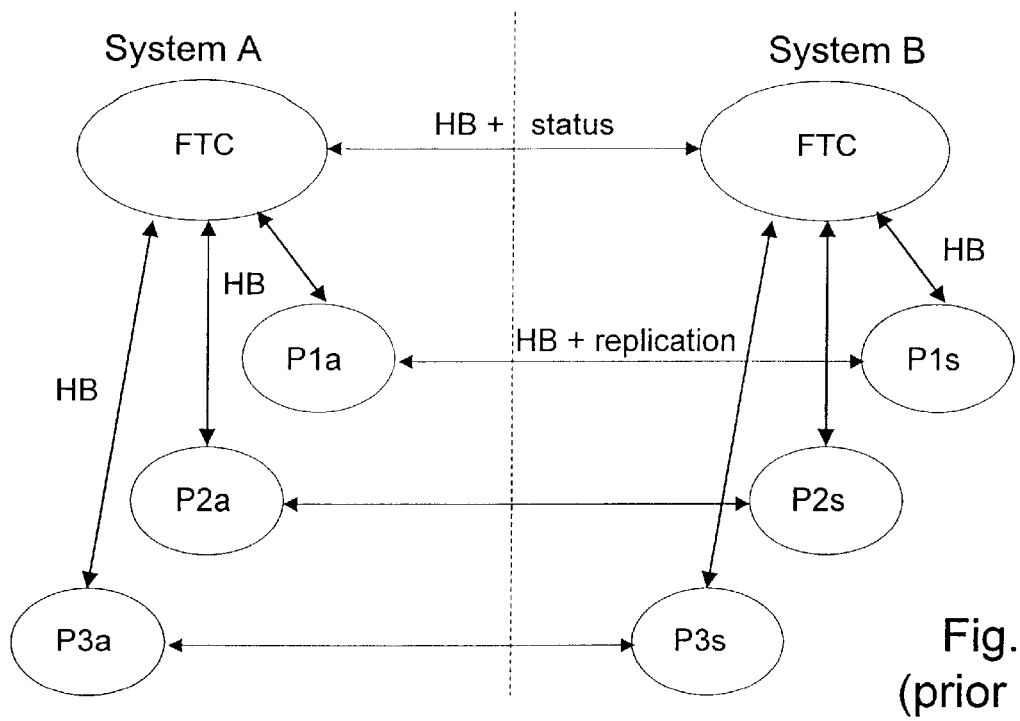
FIG. 1 illustrates a high availability mechanism used in a known platform.

In a platform including two computer systems, such as shown in FIG. 1, it is sometimes necessary to shut down one of the systems for maintenance reasons. In practice, this is achieved by asynchronously killing all the processes on the system, whereby the standby processes on the other system wake up and take over the tasks.

A problem arises when the platform, such as OpenCall SS7, manages for example telephone communications. Such an asynchronous kill, carried out randomly by an operator, although apparently under good conditions, may happen at a critical time causing data loss during the delay needed for the standby processes to take over the tasks. Indeed, when a process is killed asynchronously, the standby process must first detect, through the heart-beat mechanism, that the active process is dead before becoming active itself. The data lost may be the start time of a communication, which would have as a consequence that the cost of the communication cannot be computed and billed. The data lost may also be a first portion of a fragmented message, which is usually less detrimental because the whole message can be sent again subsequently. There is however an urge to avoid messages to be resent.

To solve this problem, the FTC is programmed, in response to a termination signal, issued for instance by the operator, to send the processes a switch-over signal. The processes are programmed, in response to such a signal, to cause a synchronization between the active and standby processes. This synchronization occurs in two phases.

In a first phase each active process enters a "stopping" mode and each standby process enters an "activating" mode. In these modes the processes no longer perform input/output operations, causing any task performed by the processes to be suspended. In particular, if a communication is requested during this phase, it will not be started until a corresponding active process can again perform input/output operations and handle the communication. Moreover, during this first phase, the processes that were active transfer all their data to the processes that were in standby. In particular, any first portion of a fragmented message received by a process that was active is transferred to a second process that will take over the reception of the fragmented message, whereby the second process will be able to entirely handle the fragmented message.

In the second phase the "stopping" processes are killed whereas the "activating" processes are made active. All the active processes are then in the state at which the stopped processes were when entering the first phase, and the suspended tasks are thus resumed.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A method for providing high availability of a computer platform, comprising the steps of:

running at least one monitored process indicating its live state by periodically sending a heart-beat message and indicating a heart-beat frequency by inserting time information in the heart-beat message;

running a fault-tolerant controller process (FTC) receiving the heart-beat message and reacting to said time information by modifying the frequency at which it expects the heart-beat message; and running an additional process and wherein the monitored process regularly sends the additional process a message and notifies the FTC that the additional process is dead when it receives an error code from an operating system after sending a message to the additional process.

2. The method of claim 1, wherein the monitored process reduces the heart-beat frequency prior to performing a long atomic operation, so that the FTC expects the next heart-beat message after the end of the atomic operation.

3. The method of claim 2, wherein the FTC declares the monitored process dead when it does not receive a heart-beat message within a predetermined time-out delay set slightly greater than the heart-beat period.

4. The method of claim 1, wherein the additional process is a second monitored process.

5. The method of claim 1, comprising a configuration file containing parameters for monitored processes which are used by the FTC, wherein a monitored process, when it starts, sends its parameters in a message to the FTC which accordingly updates the configuration file.

6. The method of claim 1, using two systems and comprising the steps of:

running, on each system, an FTC and associated monitored processes, wherein a plurality of processes running on at least a first system are in standby mode and correspond to respective active processes on the second system, such that, if the second system fails, the standby processes of the first system become active and take over the tasks of the processes that were active on the second system; and when it is necessary to force shut down of one system, sending the processes a switch-over signal, causing said active processes to die and the respective standby processes on the other system to become active through a transition phase in which the processes do not perform input/output operations.

7. A high availability platform arranged, in operation, to carry out the method of claim 1.

8. A method for providing high availability of a computer platform, comprising the steps of:

running at least one monitored process indicating its live state by periodically sending a heart-beat message and indicating a heart-beat frequency by inserting time information in the heart-beat message;

running a fault-tolerant controller process (FTC) receiving the heart-beat message and reacting to said time information by modifying the frequency at which it expects the heart-beat message;

running, on each system, an FTC and associated monitored processes, wherein a plurality of processes running on at least a first system are in standby mode and correspond to respective active processes on the second system, such that, if the second system fails, the standby processes of the first system become active and take over the tasks of the processes that were active on the second system; and when it is necessary to force shut down of one system, sending the processes a switch-over signal, causing said active processes to die and the respective standby processes on the other system to become active through a transition phase in which the processes do not perform input/output operations.

* * * * *